(12) United States Patent
Yu et al.

(10) Patent No.: US 9,455,620 B2
(45) Date of Patent: Sep. 27, 2016

(54) AC/DC CONVERTER WITH CLAMPED BOOST AND BUCK MODES AND DC OUTPUT HARMONIC CONTROL

(71) Applicant: Infineon Technologies Austria AG, Villach (AT)

(72) Inventors: Weifu Yu, Singapore (SG); Yi Tang, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 259 days.

(21) Appl. No.: 14/104,545

(22) Filed: Dec. 12, 2013

(65) Prior Publication Data

US 2015/0171734 A1 Jun. 18, 2015

(51) Int. Cl.
*H02M 1/12* (2006.01)
*H02M 1/14* (2006.01)
(Continued)

(52) U.S. Cl.
CPC .............. *H02M 1/12* (2013.01); *H02M 1/4208* (2013.01); *H02M 7/217* (2013.01); *H02M 2001/0093* (2013.01); *H02M 2001/4291* (2013.01); *Y02B 70/126* (2013.01)

(58) Field of Classification Search
CPC ........ H02M 1/12; H02M 1/14; H02M 1/143; H02M 1/146; H02M 1/15; H02M 1/42; H02M 1/4208; H02M 1/4225; H02M 1/4233; H02M 1/425; H02M 1/126; H02M 1/44; H02M 7/06; H02M 7/217; H02M 7/08; H02M 2001/4275; H02M 2001/4283; H02M 2001/4291; H02M 3/158; H02M 3/1582; H02M 3/1584; H02M 3/1586; H02M 1/4216; H02M 7/02; H02M 7/062; H02M 2001/123; H02M 2001/0093; Y02B 70/12; Y02B 70/123; Y02B 70/126; Y02B 70/1416; Y02B 70/1425

USPC ................. 363/15–21.03, 34, 35, 37, 39–48, 363/67–70, 81, 84, 87, 88, 101, 123–128, 363/52–54, 89; 323/205–211, 222–226, 323/266, 268, 271–276, 282–288, 299–303, 323/351, 259
See application file for complete search history.

(56) References Cited

U.S. PATENT DOCUMENTS

| 5,016,157 | A | * | 5/1991 | Rozman | H02M 5/452 307/105 |
| 5,956,243 | A | * | 9/1999 | Mao | H02M 1/4208 363/143 |
| 2002/0190696 | A1 | * | 12/2002 | Darshan | H02H 9/001 323/207 |

OTHER PUBLICATIONS

Singh et al., "A Review of Single-Phase Improved Power Quality AC-DC Converters," IEEE Transactions of Industrial Electronics, vol. 50, No. 5, Oct. 2003, pp. 962-981.
(Continued)

*Primary Examiner* — Timothy J Dole
*Assistant Examiner* — Carlos Rivera-Perez
(74) *Attorney, Agent, or Firm* — Shumaker & Sieffert, P.A.

(57) ABSTRACT

Methods, devices, and circuits are disclosed for a buck-type AC/DC converter with DC output harmonic control. One example is directed to a AC/DC converter configured to generate a DC output at a target output voltage. The converter is configured to, responsive to an AC input voltage being less than the target output voltage, convert the AC input voltage to a boosted DC output voltage. The converter is further configured to, responsive to the AC input voltage being greater than the target output voltage, convert a first portion of the AC input voltage to a clamped boosted DC output voltage. The converter is further configured to buffer a second portion of the AC input voltage to a buffered DC voltage. The converter is further configured to apply the buffered DC voltage to the clamped boosted DC output voltage.

18 Claims, 9 Drawing Sheets

(51) Int. Cl.
*H02M 7/217* (2006.01)
*H02M 1/42* (2007.01)
*H02M 1/00* (2006.01)

(56) References Cited

OTHER PUBLICATIONS

Jang et al., "Bridgeless High-Power-Factor Buck Converter," IEEE Transactions on Power Electronics, vol. 26, No. 2, Feb. 2011, pp. 602-611.

Wei et al., "Comparison of Basic Converter Topologies for Power Factor Correction," IEEE Southeast Conference, Apr. 24-26, 1998, pp. 348-353.

Krein et al., "Cost-Effective Hundred-Year Life for Single-Phase Inverters and Rectifiers in Solar and LED Lighting Applications Based on Minimum Capacitance Requirements and a Ripple Power Port," IEEE, Applied Power Electronics Conference and Exposition, Feb. 15-19, 2009, pp. 620-625.

Huber et al., "Design-Oriented Analysis and Performance Evaluation of Buck PFC Front End," IEEE Transactions on Power Electronics, vol. 25, No. 1, Jan. 2010, pp. 85-94.

\* cited by examiner

AC/DC CONVERTER WITH CLAMPED BOOST AND BUCK MODES AND DC OUTPUT HARMONIC CONTROL

TECHNICAL FIELD

This disclosure relates to electrical power converters, and in particular, to AC/DC converters.

BACKGROUND

Buck or boost converters may be used as drivers for loads with specific current and/or voltage requirements. A buck converter applies an output voltage that is less than its input voltage. An alternating current/direct current (AC/DC) converter may also have buck capability. This may be implemented as a two stage converter that combines a first stage boost power factor correction (PFC) converter with a cascaded second stage buck converter to add buck capability. A converter with boost capability provides an output voltage that is higher than the input voltage. A PFC converter provides some degree of power factor correction to counteract the leading or lagging conflicting impedance inherent in AC/DC conversion. In other examples, a buck-boost converter may be implemented as a PFC converter.

AC/DC converters may exhibit second-order ripple voltage in the DC output. A boost converter may be implemented with an additional ripple canceling converter added to the output. An additional rectifier converter may conduct the DC output ripple voltage of the boost converter to an assisted capacitor. A boost converter may also be implemented with an additional inductor and associated circuit, and with MOSFET or IGBT bridges instead of a diode bridge, to address DC-link ripple.

SUMMARY

In general, various examples of this disclosure are directed to an AC/DC converter with both boost and buck capabilities, with a clamped boost and buck mode, and with DC output harmonic control. In various examples of this disclosure, an AC/DC converter with DC output harmonic control may enable efficient power factor correction (PFC) and efficient AC/DC power conversion with boost and buck capabilities, among other advantages. For example, a converter of this disclosure may include control methods to conduct second and fourth order harmonics that would otherwise appear on the DC-link to an assisted buffer capacitor, without an additional penalty in efficiency.

One example is directed to an AC/DC converter configured to generate a DC output at a target output voltage. The converter is configured to, responsive to an AC input voltage being less than the target output voltage, convert the AC input voltage to a boosted DC output voltage. The converter is further configured to, responsive to the AC input voltage being greater than the target output voltage, convert a first portion of the AC input voltage to a clamped boosted DC output voltage. The converter is further configured to buffer a second portion of the AC input voltage to a buffered DC voltage. The converter is further configured to apply the buffered DC voltage to the clamped boosted DC output voltage.

Another example is directed to a method of AC/DC conversion to generate a DC output at a target output voltage. The method includes, responsive to an AC input voltage being less than the target output voltage, converting the AC input voltage to a boosted DC output voltage. The method further includes, responsive to the AC input voltage being greater than the target output voltage, converting a first portion of the AC input voltage to a clamped boosted DC output voltage. The method further includes buffering a second portion of the AC input voltage to a buffered DC voltage. The method further includes applying the buffered DC voltage to the clamped boosted DC output voltage.

Another example is directed to a device for receiving an AC input voltage and generating a DC output at a target output voltage. The device includes means for determining whether the AC input voltage is less than the target output voltage. The device further includes means for, responsive to the AC input voltage being less than the target output voltage, converting the AC input voltage to a boosted DC output voltage. The device further includes means for, responsive to the AC input voltage being greater than the target output voltage, converting a first portion of the AC input voltage to a clamped boosted DC output voltage. The device further includes means for buffering a second portion of the AC input voltage to a buffered DC voltage. The device further includes means for applying the buffered DC voltage to the clamped boosted DC output voltage.

The details of one or more examples of the invention are set forth in the accompanying drawings and the description below. Other features, objects, and advantages of the invention will be apparent from the description and drawings, and from the claims.

DETAILED DESCRIPTION

As noted above, in various examples of this disclosure, an AC/DC converter with a clamped boost and buck mode may enable DC output harmonic control, efficient power factor correction (PFC), and efficient AC/DC power conversion with buck and boost capabilities, among other advantages. For example, a converter of this disclosure may conduct second order harmonics that would otherwise appear on a DC-link to an assisted capacitor without an additional penalty. In some examples, a converter of this disclosure may be implemented with a bridgeless three-level boost, and with a DC-buffer capacitor with a buck converter that may convert partial input power to the load. A converter of this disclosure may apply advanced voltage ripple control in a DC output, providing more efficient power conversion and reducing stresses on downstream components, among other advantages.

Figure 1:
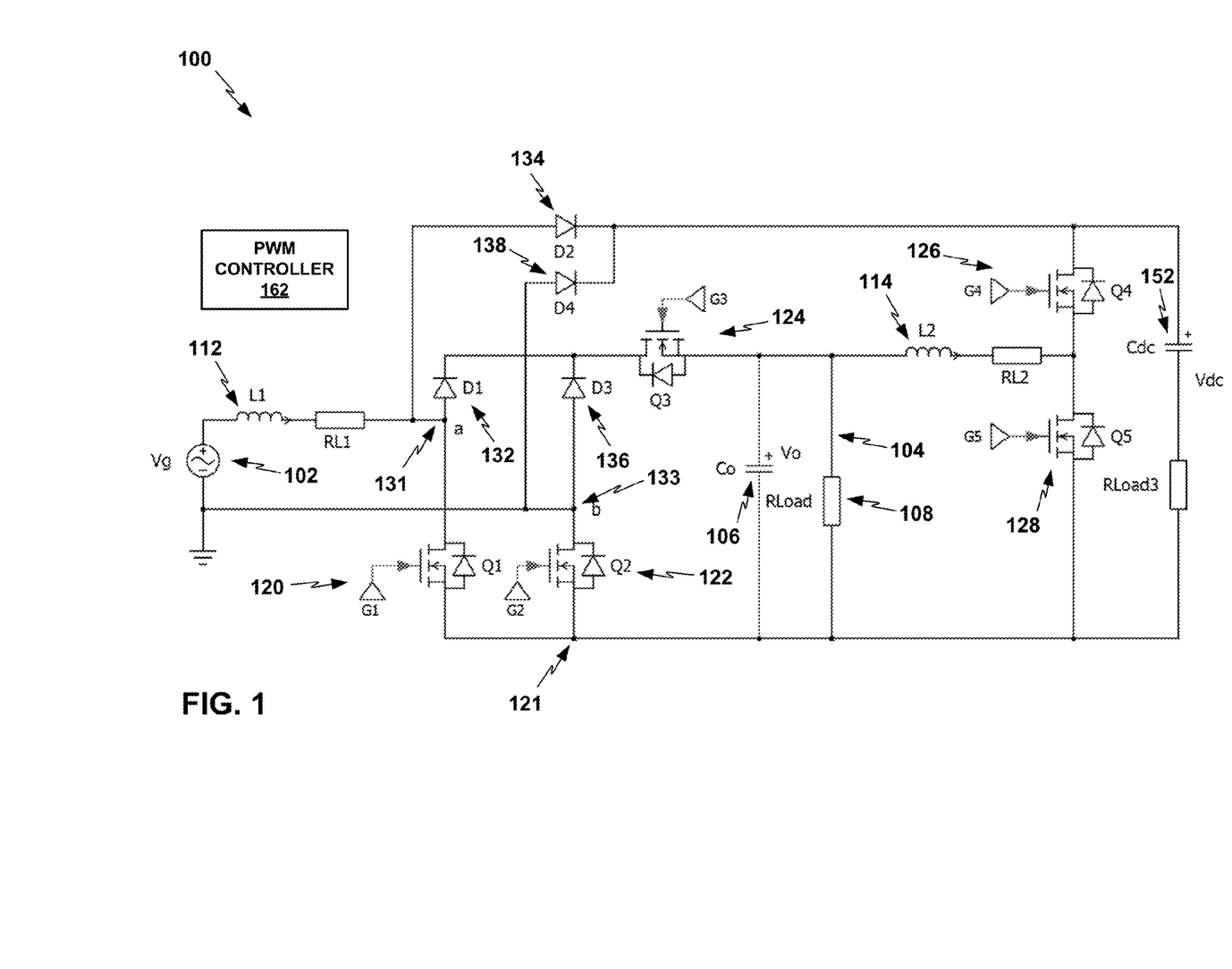
FIG. 1 is a block diagram illustrating a buck-type AC/DC converter with a boost mode and a clamped boost and buck mode, in accordance with an example of this disclosure.

FIG. 1 is a block diagram illustrating a buck-type AC/DC converter 100 with a boost mode and a clamped boost and buck mode, in accordance with an example of this disclosure. Converter 100 includes an grid voltage input 102 at an input voltage or grid voltage $V_g$; an output node 104 and an output capacitor 106 (Co) at an output voltage $V_o$; and a load 108 connected to the output node 104. Converter 100 further includes a boost inductor 112 (L1) and a buck inductor 114 (L2); MOSFET switches 120, 122, 124, 126, and 128 (Q1, Q2, Q3, Q4, Q5) ("switches 120-128"); diodes 132, 134, 136, and 138 (D1, D2, D3, D4); a buffer capacitor 152 (Cdc); and a pulse width modulation (PWM) controller 162. (FIG. 1 also shows resistors RL1, RL2, and RL3, but these are indicative of the parasitic resistance of inductors L1 and L2 and buffer capacitor Cdc, respectively, and are not separate physical resistors. FIG. 1 also depicts nodes 121, 131, and 133, which are described further below in comparison with FIG. 2.) Controller 162 is operatively connected to switches 120, 122, 124, 126, and 128 via gates G1, G2, G3, G4, G5, respectively (connections not shown in FIG. 1), and is thereby enabled to open and close switches 120-128.

Controller 162 may also receive inputs indicating the voltage values of the input voltage $V_g$ and the output voltage $V_o$. Controller 162 may control switches 120-128, and converter 100 in general, to operate in one of various operating modes based at least in part on the input voltage $V_g$ and the output voltage $V_o$. For instance, in one example, controller 162 may control converter 100 to operate in a first mode with voltage boost when input AC voltage $V_g$ is less than output voltage $V_o$, and in a second mode that alternates between clamped boost and buck when input AC voltage $V_g$ is greater than output voltage $V_o$. Controller 162 may also store or access an indication of a required output voltage, and select an operating mode (e.g., the first mode or the second mode) to apply an output voltage $V_o$ that is at the required output voltage or within a nominal range of the required output voltage, whether the input voltage $V_g$ is less than or greater than the required output voltage.

In the first mode, when input AC voltage $V_g$ is less than the required output voltage, controller 162 configures converter 100 to apply a boost to the input AC voltage $V_g$, and convert the input AC voltage to a boosted DC output voltage. In particular, when the input voltage $V_g$ is positive and lower than the output voltage $V_o$, controller 162 controls switches 124 (Q3) and 122 (Q2) to be always on (conducting), and uses switch 120 (Q1) as a boost switch. Diodes 134 (D2) and 138 (D4) are not conducting. In this configuration, switch 120 (Q1), diode 132 (D1), and boost inductor 112 (L1) act as a voltage inverter, causing converter 100 to apply a single stage boost to the input AC voltage $V_g$, and apply the resulting boosted DC output voltage directly to the output node 104. When the input voltage $V_g$ is negative and lower (in its absolute value $|V_g|$) than the output voltage $V_o$, controller 162 controls switches 124 (Q3) and 122 (Q2), diode 134 (D2), and boost inductor 112 (L1) to act as a voltage inverter, again causing converter 100 to apply a single stage boost to the input AC voltage $V_g$, and apply the resulting boosted DC output voltage directly to the output node 104. Converter 100 thereby inverts the voltage of the input AC voltage during the negative portions of the AC phase, and boosts the voltage across the entire phase, to generate a DC output voltage.

In the second mode, when input AC voltage $V_g$ is greater than the required output voltage, controller 162 configures converter 100 to apply both a clamped boost and a buck to the AC input voltage in different portions of its phase, to generate an output DC voltage $V_o$ that is less than the AC input voltage $|V_g|$. Converter 100 operates in this second mode in response to the AC input voltage $|V_g|$ being greater than the required output voltage.

In the second mode, controller 162 configures converter 100 to divide the input AC voltage into two portions, a first portion collected in the interval when the input AC voltage is in the portion of its AC phase when it is lower than the required output voltage, and a second portion collected in the interval when the input AC voltage is in the portion of its AC phase when it is greater than the required output voltage. Controller 162 configures converter 100 to convert the first portion of the input AC voltage to a clamped boosted DC output voltage. Controller 162 configures converter 100 to buck and buffer the second portion of the AC input voltage and apply the bucked and buffered second voltage portion to the clamped boosted DC output voltage. Due to the buffering, converter 100 applies the bucked and buffered second voltage portion to the output voltage out of phase with the phase of the clamped boosted DC output voltage from the first voltage portion, in such a way as to compensate for the reduced-energy portion of the phase of the first voltage portion and to cancel the output ripple. Converter 100 thereby generates an output DC voltage from a higher AC input voltage that is net bucked from the AC input voltage and that is maintained at a precise value of voltage with low ripple.

In a particular example of converter 100 operating in the second mode, when the AC input voltage $|V_g|$ is higher than the required output voltage, when the AC input voltage $V_g$ is positive, controller 162 configures converter 100 to have keep switch 120 (Q1) off (open and not conducting), to keep switch 122 (Q2) on (conducting), and to use switch 124 (Q3) as the main control switch. Converter 100 in this configuration uses switch 124 (Q3), boost inductor 112 (L1), and diodes 132 (D1) and 134 (D2) to operate as a three-level converter that provides a clamped boost. Converter 100 modulates switch 124 (Q3) according to the input voltage $|V_g|$ and the DC buffer capacitor voltage $V_{dc}$ at the DC buffer capacitor 152. When switch 124 (Q3) is on, current flows through boost inductor 112 (L1), diode 132 (D1), and switch 124 (Q3), then falls back to slot through switch 122 (Q2). Diodes 132 (D1) and 134 (D2) function as clamping diodes that contribute to clamping the voltage. Converting the first portion of the AC input voltage to the clamped boosted DC output voltage may include directing the first portion of the AC input voltage through a boost inductor 112 (L1) and clamping diodes 132 (D1) and 134 (D2) to output node 104. The voltage across the boost inductor 112 (L1) is clamped at $|V_g|-V_o$, and converter 100 applies the clamped voltage directly to output node 104. The remainder of the energy passing through boost inductor 112 (L1) that rises above the level of the voltage clamp is directed through buck inductor 114 (L2) to DC buffer capacitor 152, instead of going to output node 104, and accumulates at DC buffer capacitor 152.

When switch 124 (Q3) is off, the current flows through boost inductor 112 (L1), diode 134 (D2), and DC buffer capacitor 152, and falls back to slot through switch 126 (Q4). The power is boosted to the DC buffer capacitor 152. A portion of converter 100 acts as a buck converter to convert the boosted energy from DC buffer capacitor 152 to the load 108. In particular, the portion of converter 100 used to act as a buck converter includes DC buffer capacitor 152, buck inductor 114 (L2), and switches 126 (Q4) and 128 (Q5).

Controller 162 modulates the buck converter portion of converter 100 to regulate the voltage $V_{dc}$ at DC buffer capacitor 152. Converter 100 divides the input energy into two portions, in different portions of the AC input phase. As the AC input voltage rises and falls during its AC phase, its instantaneous value spends part of the AC phase below the target output voltage, and part of the AC phase above the target output voltage. These two portions may be considered to be divided by a cutoff value.

In the first portion of the AC input phase, when the input voltage is below the cutoff, controller 162 keeps switch 124 (Q3) on, allowing energy to flow from boost inductor 112 (L1) directly to the output capacitor 106 and output node 104. In the second portion of the AC input phase, when the input voltage is above the cutoff, controller 162 keeps switch 124 (Q3) off, redirecting energy to flow from boost inductor 112 (L1) through diodes 134 (D2) or 128 (D4) to DC buffer capacitor 152. Once the AC input has fallen and the input energy is below the cutoff again, controller 162 releases energy from DC buffer capacitor 152 through switches 126 (Q4) and 128 (Q5) through buck inductor 114 (L2) to output capacitor 106 and output node 104.

Converter 100 thereby uses DC buffer capacitor 152 to store the second portion of the input energy, the ripple energy, during the portion of the AC input phase when the AC input voltage is above the required DC output voltage. Converter 100 uses its buck converter features, by switching switches 126 (Q4) and 128 (Q5) to channel energy through DC buffer capacitor 152 and buck inverter 114 (L2), to convert this second portion of the input energy to the load 108 during the portion of the AC input phase when the AC input voltage is below the required output voltage. Converter 100 thereby cancels the output voltage ripple. Therefore, converter 100 boosts the input voltage to the DC buffer capacitor 152, and bucks the DC buffer capacitor voltage $V_{dc}$ to the output voltage at the output capacitor 106 and the output node 104, thereby canceling the output ripple and smoothing the DC output voltage $V_o$. This ripple cancellation and output voltage smoothing is further depicted in the subsequent figures and further described below.

Converter 100 is therefore an AC/DC converter configured to generate a DC output at a target output voltage. Converter 100 is configured to, responsive to an AC input voltage at grid voltage input 102 being less than the target output voltage, convert the AC input voltage to a boosted DC output voltage at output node 104. Converter 100 is configured to, responsive to the AC input voltage being greater than the target output voltage, divide the AC input voltage into the first portion and the second portion as separated by a cutoff in an AC phase of the AC input voltage, wherein the cutoff is set at the target output voltage; convert a first portion of the AC input voltage to a clamped boosted DC output voltage, directed through switch 124 (Q3) to output node 104; buffer a second portion of the AC input voltage to a buffered DC voltage at DC buffer capacitor 152; and apply the buffered DC voltage to the clamped boosted DC output voltage. Converter 100 may direct the buffered DC voltage through buck inductor 114 (L2) prior to applying the bucked, buffered DC voltage to the clamped boosted DC output voltage. Converting the first portion of the AC input voltage to the clamped boosted DC output voltage may include directing the first portion of the AC input voltage through a boost converter and clamping diodes to output node 104.

Figure 2:
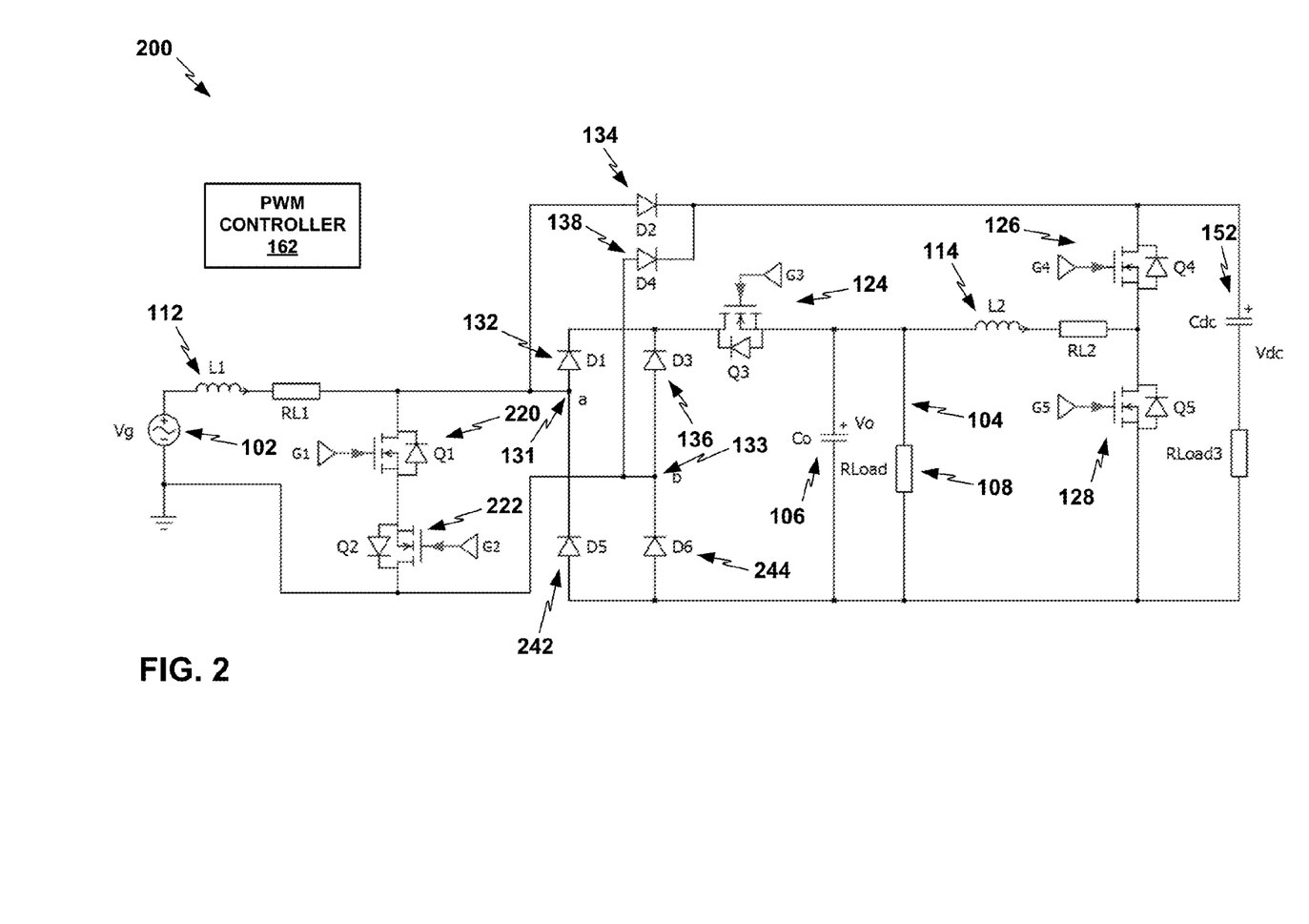
FIG. 2 is a block diagram illustrating a buck-type AC/DC converter with a boost mode and a clamped boost and buck mode, in accordance with another example of this disclosure.

FIG. 2 is a block diagram illustrating a buck-type AC/DC converter 200 with a boost mode and a clamped boost and buck mode, in accordance with another example of this disclosure. Converter 200 includes many components in common with converter 100 of FIG. 1, and indicated in FIG. 2 with identical numbering, and in a similar topology to converter 100, though with some significant differences. Whereas converter 100 includes a node 121 between switches 120 (Q1) and 122 (Q2) connecting to output 108, converter 200 lacks node 121. Converter 200 also includes two additional diodes 242 (D5) and 244 (D6), disposed opposite input-connected nodes 131 and 133 from diodes 132 (D1) and 136 (D3). Converter 200 is enabled to maintain a lower common mode current, compared to converter 100 of FIG. 1, while performing the same functions, including ripple cancellation and output voltage smoothing, as described above.

Figure 3:
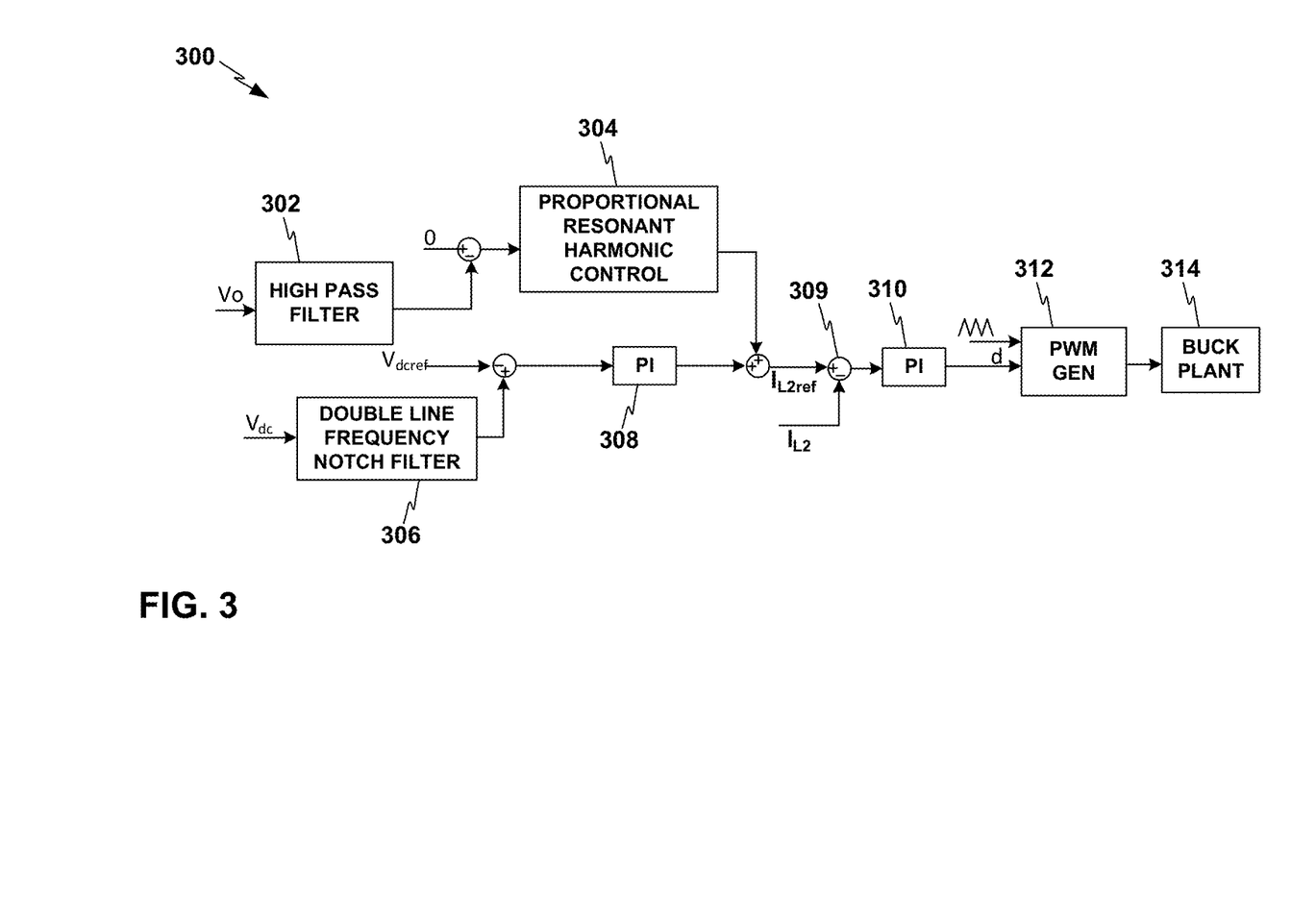
FIG. 3 is a schematic diagram illustrating a ripple cancelling buck controller that implements some functions of a PWM controller of FIG. 1 or 2, in accordance with an example of this disclosure.

FIG. 3 is a schematic diagram illustrating a ripple cancelling buck controller 300 that implements some functions of PWM controller 162 of FIG. 1 or 2, in accordance with an example of this disclosure. Buck controller 300 may be implemented in hardware, software, or any combination of the two, as part of PWM controller 162 of FIG. 1 or 2. Buck controller 300 may implement a ripple cancelling buck control with a DC output ripple cancelling loop and harmonic control, such as by operating switches 126 (Q4) and 128 (Q5) of FIG. 1 or 2 to control ripple canceling.

Buck controller 300 includes a high pass filter 302 with a frequency cutoff that receives an indication of the output voltage $V_o$, such as at output 108 in converters 100 or 200. The frequency cutoff may be at 80 hertz (Hz) in one example, or may be at another frequency value that is significantly greater than the expected AC input voltage frequency, such as 100, 120, or 150 Hz, or any value appropriate for system parameters within nominal engineering design. The high pass filter 302 applied to the output voltage $V_o$ obtains an indication of the ripple voltage, for any ripple voltage occurring in the output voltage $V_o$.

Buck controller 300 further includes proportional resonant harmonic control 304, that may be implemented to control second and fourth order harmonic resonances, relative to the AC input voltage. Proportional resonant harmonic control 304 may be configured to control at least a second order harmonic resonance, and additionally one or more higher order harmonics including fourth order, in some examples. For example, in an implementation for an AC input voltage frequency of 50 Hz, proportional resonant harmonic control 304 may function to control second and fourth order harmonic resonances at 100 Hz and 200 Hz. In another example implemented for an AC input voltage frequency of 60 Hz, proportional resonant harmonic control 304 may function to control second and fourth order harmonic resonances at 120 Hz and 240 Hz. Without ripple cancelling control, when energy is directed from AC input to DC via diode 134 (D2) may contain high 2nd and 4th order harmonics. Proportional resonant harmonic control 304 may function to cancel these harmonics.

Buck controller 300 also includes a double line frequency notch filter 306 that receives an indication of the DC buffer capacitor voltage $V_{dc}$, such as at DC buffer capacitor 152 in FIG. 1 or 2. The output of double line frequency notch filter 306 and a DC buffer capacitor voltage reference may be compared and processed through a proportional integral 308. The DC voltage loop may be used to control the voltage of DC buffer capacitor 152. Double line frequency notch filter 306 may be used in eliminating the disturbance of 2nd order ripple voltage on the DC buffer capacitor 152.

The outputs of proportional resonant harmonic control 304 and proportional integral 308 may be compared and used for a reference value $I_{L2ref}$ for the buck inductor current $I_{L2}$ of the buck inductor 114 (L2). Buck controller 300 may compare the buck inductor current reference value $I_{L2ref}$ with the buck inductor current $I_{L2}$ of the buck inductor 114 (L2), and process the results through a proportional integral 310 and a PWM generator 312, which is output to buck plant 314. Buck plant 314 is an indication of the output to control components of converter 100 or 200 that function as a buck converter, such as switches 126 (Q4) and 128 (Q5). Buck controller 300 may thereby control the buck converter components of converter 100 or 200, including DC buffer capacitor 152 and buck inductor 114 (L2), to cancel the output voltage ripple. Buck controller 300 may therefore determine the ripple canceling phase that opposes the ripple phase of the clamped boosted DC output voltage based at least in part on the indication of the buck inductor current.

Buck controller 300 may therefore apply the buffered DC voltage in a ripple canceling phase that opposes the ripple phase of the clamped boosted DC output voltage. This may include receiving an indication of the clamped boosted DC output voltage, e.g., the output voltage $V_o$ as received at high pass filter 302; receiving an indication of the buffered DC voltage $V_{dc}$, e.g., with double line frequency notch filter 306; and determining the ripple canceling phase that opposes the ripple phase of the clamped boosted DC output voltage, based at least in part on the indication of the clamped boosted DC output voltage and the indication of the buffered DC voltage.

Figure 4:
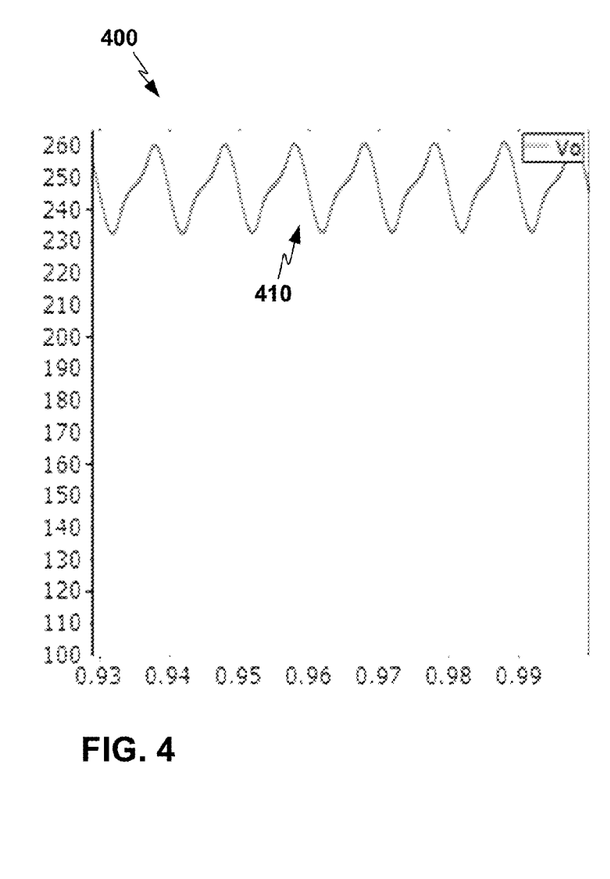
FIG. 4 shows a graph of a DC output voltage in the absence of DC buffer harmonic cancelling control, in accordance with an example of this disclosure.

FIG. 4 shows a graph 400 of a DC output voltage $V_o$ in the absence of DC buffer harmonic cancelling control, in accordance with an example of this disclosure. As shown in FIG. 4, graph 400 shows time on the x axis (in seconds), voltage on the y axis, and the output voltage 410 as a function of time. As shown in FIG. 4, output voltage 410 has an average value of approximately 245 volts, and has a ripple of approximately plus or minus 15 volts at a frequency of approximately 100 hertz, exhibiting a second-order harmonic (and the ripple shows some irregularity, symptomatic of an additional fourth-order harmonic). This ripple could cause unwanted stresses or resonances in downstream components, which may include any type of sensitive and valuable components.

Figure 5:
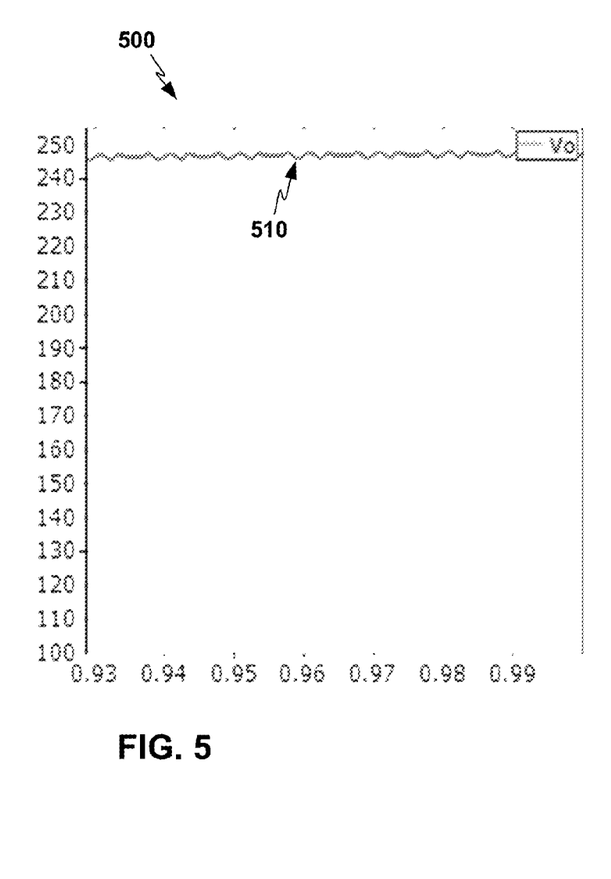
FIG. 5 shows a graph of a DC output voltage of a converter with implementation of DC buffer harmonic cancelling control, in accordance with an example of this disclosure.

FIG. 5 shows a graph 500 of a DC output voltage $V_o$ of converter 100 or 200 with implementation of DC buffer harmonic cancelling control, in accordance with an example of this disclosure. FIG. 5 also shows time on the x axis (in seconds) and voltage on the y axis (though at a slightly different scale than FIG. 4, from 100 to 250 rather than 100 to 260). As shown in FIG. 5, output voltage 510 also has an average value of approximately 245 volts, but has its ripple canceled. Instead, output voltage 510 exhibits slight variations within approximately plus or minus one volt, and are at least significantly non-periodic, suggesting they are the remaining result of system noise and/or measuring apparatus noise, with very little if any remaining ripple. Some examples may generate output voltage ripple that is reduced but still detectable, while some examples may generate output voltage that is free of detectable ripple.

Converter 100 or 200 of this disclosure may therefore generate output voltage with ripple cancelation. Converter 100 or 200 may also generate output voltage with a unit power factor (power factor of 1.0). Additionally, while some traditional AC/DC converters with unit power factor exhibit a dead zone artefact of the AC input voltage and the resulting current harmonics, due to lack of DC output carried over from the AC input being close to zero during transitions between positive and negative portions of the AC phase, the buffered DC output and ripple cancelation of converter 100 or 200 of this disclosure enable unit power factor without a dead zone. Converter 100 or 200 of this disclosure also has high efficiency, due to factors that include converting the input power directly to the output when the input voltage is in the portion of its phase when it is lower than the target output voltage, and implementing a clamped three level converter to convert the input energy to DC buffer capacitor 152 when the input voltage is above the target output voltage. DC buffer capacitor 152 may be used to cancel the output voltage ripple without an efficiency penalty, in some examples.

Converters of this disclosure may generate a ripple-canceled output voltage with low cost. Considering the examples of converters 100 and 200 of FIGS. 1 and 2, the voltage stress of switch 124 (Q3) may be either the output voltage or the difference between the buffer capacitor voltage and the output voltage, whichever is higher, but both of which may remain relatively low. As a result, switch 124 (Q3) may be implemented with a relatively low voltage and low cost MOSFET or insulated-gate bipolar transistor (IGBT). The buck converter portion of converter 100 or 200 may transfer only a relatively small portion of the power of the whole system. Since the power rating of the buck portion, including DC buffer capacitor 152, may be small compared to the system power of converter 100 or 200, DC buffer capacitor 152 may be implemented with a relatively low-cost capacitor. For the same reasons, DC buffer capacitor 152 may be implemented in a capacitor that is relatively low-volume, enabling a relatively low impact on the volume of converter 100 or 200 as a whole. Using a diode clamped three-level converter, as discussed above, as the main power factor correction (PFC), may contribute to efficiency of converter 100, 200 and can function as a buck converter without the need for a bulky heat-sink. Ripple cancelation may be partly implemented in PWM controller 162 with software, which may avoid the cost of achieving analogous results in hardware.

Figure 6:
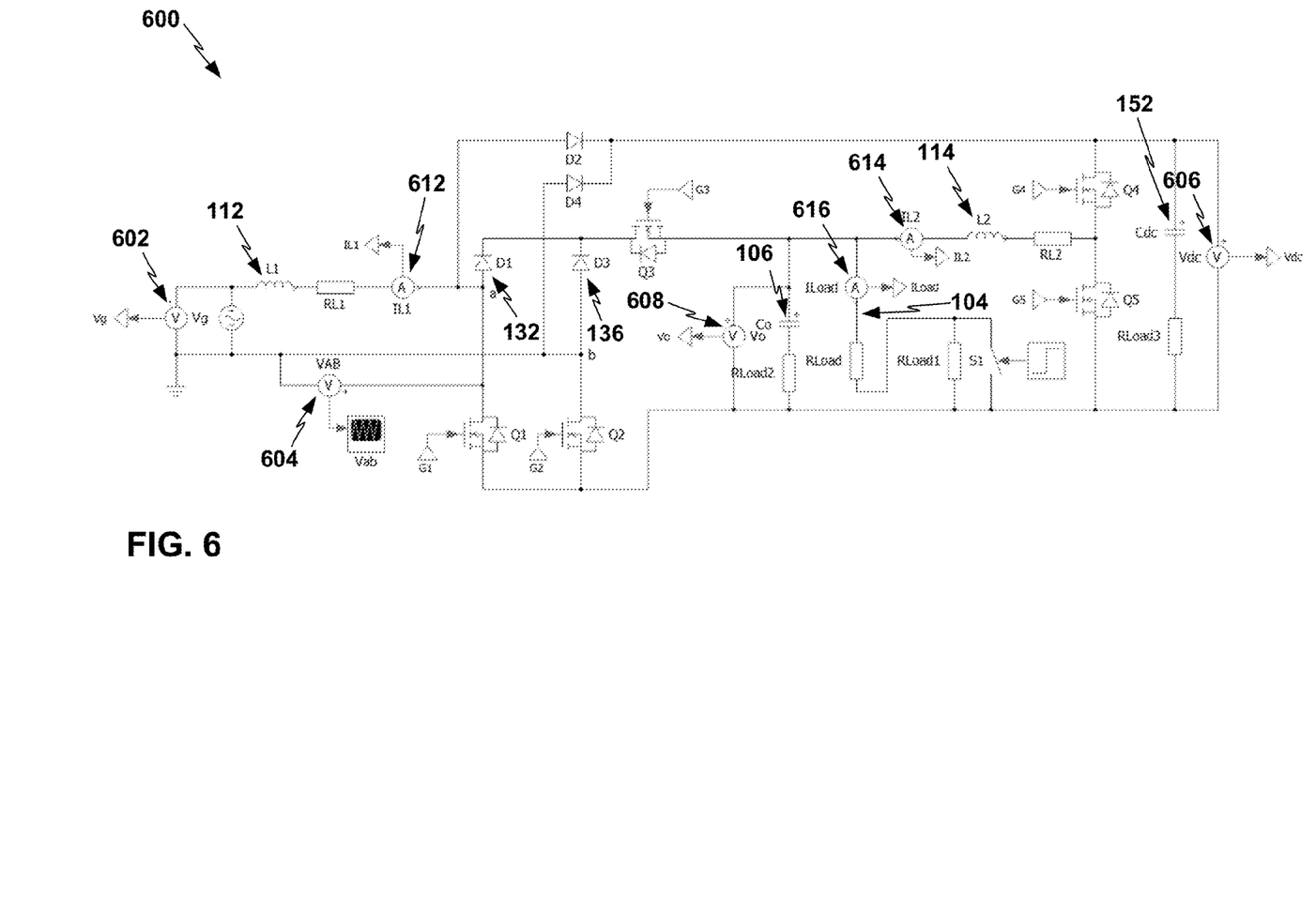
FIG. 6 is a block diagram illustrating a buck-type AC/DC converter with a boost mode and a clamped boost and buck mode and with voltage and current meters to evaluate transmit indications of various voltage and current values, in accordance with an example of this disclosure.

FIG. 6 is a block diagram illustrating a buck-type AC/DC converter 600 with a boost mode and a clamped boost and buck mode and with voltage and current meters to evaluate transmit indications of various voltage and current values, in accordance with an example of this disclosure. Converter 600 of FIG. 6 is analogous to and includes all the same like-numbered elements of converter 100 of FIG. 1. Converter 600 also includes voltage meters 602, 604, 606, and 608, and current meters 612, 614, and 616. Voltage meter 602 reads a grid input voltage $V_g$ (e.g., at grid voltage input 102). Voltage meter 604 reads an input-connected node voltage $V_{AB}$ (e.g., at input-connected nodes 131 and 133). Voltage meter 606 reads a DC buffer capacitor voltage $V_{dc}$ (e.g., at DC buffer capacitor 152). Voltage meter 608 reads an output voltage $V_o$ (e.g., at output capacitor 106 and output node 104). Current meter 612 reads a boost inductor current $I_{L1}$ (e.g., at boost inductor 112 (L1)). Current meter 614 reads a buck inductor current $I_{L2}$ (e.g., at buck inductor 114 (L2)). Current meter 616 reads a load current $I_{load}$ (e.g., at an output node 104).

Figure 7:
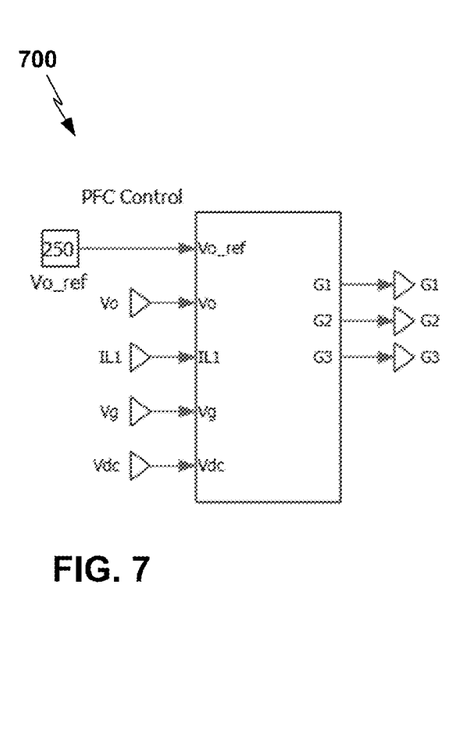
FIG. 7 is a block diagram illustrating a power factor correction (PFC) control unit that receives indications of various voltage and current values from a converter, and generates control signals based at least in part on the voltage and current values, in accordance with an example of this disclosure.

FIG. 7 is a block diagram illustrating a power factor correction (PFC) control unit 700 that receives indications of various voltage and current values from converter 600, and generates control signals based at least in part on the voltage and current values, in accordance with an example of this disclosure. PFC control unit 700 may be integrated in or be a portion of controller 162 of converters 100, 200, or 600 of FIG. 1, 2, or 6. PFC control unit 700, in this example, receives indications of a reference output voltage $V_{o\_ref}$, an output voltage $V_o$ (e.g., at output capacitor 106 and output node 104), a boost inductor current $I_{L1}$ (e.g., at boost inductor 112 (L1)), a grid input voltage $V_g$ (e.g., at grid voltage input 102), and a DC buffer capacitor voltage $V_{dc}$ (e.g., at DC buffer capacitor 152). PFC control unit 700, in this example, generates control signals to control switches 120 (Q1), 122 (Q2), and 124 (Q3) in converter 100, 200, or 600, based at least in part on one or more of the inputs described above.

Figure 8:
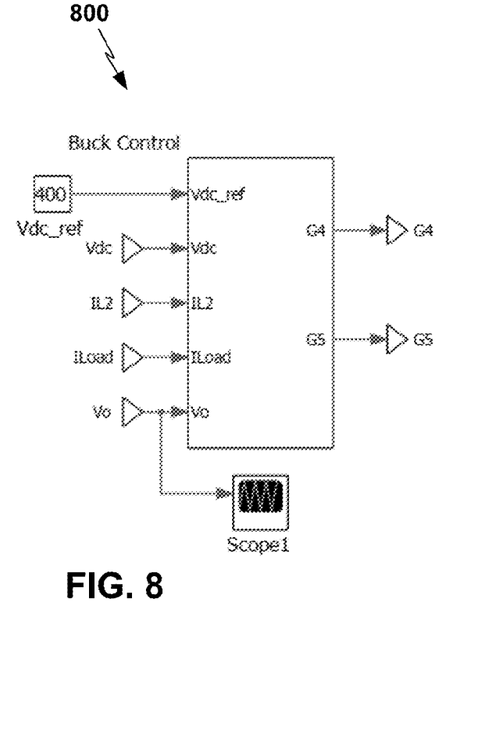
FIG. 8 is a block diagram illustrating a buck control unit that receives indications of various voltage and current values from a converter, and generates control signals based at least in part on the voltage and current values, in accordance with an example of this disclosure.

FIG. 8 is a block diagram illustrating a buck control unit 800 that receives indications of various voltage and current values from converter 600, and generates control signals based at least in part on the voltage and current values, in accordance with an example of this disclosure. Buck control unit 800 may be integrated in or be a portion of controller 162 of converters 100, 200, or 600 of FIG. 1, 2, or 6. Buck control unit 800, in this example, receives indications of a reference DC buffer capacitor voltage $V_{dc\_ref}$, a DC buffer capacitor voltage $V_{dc}$ (e.g., at DC buffer capacitor 152), a boost inductor current $I_{L1}$ (e.g., at boost inductor 112 (L1)), a load current $I_{load}$ (e.g., at an output node 104), and an output voltage $V_o$ (e.g., at output capacitor 106 and output node 104). Buck control unit 800, in this example, generates control signals to control switches 126 (Q4) and 128 (Q5) in converter 100, 200, or 600, based at least in part on one or more of the inputs described above.

Figure 9:
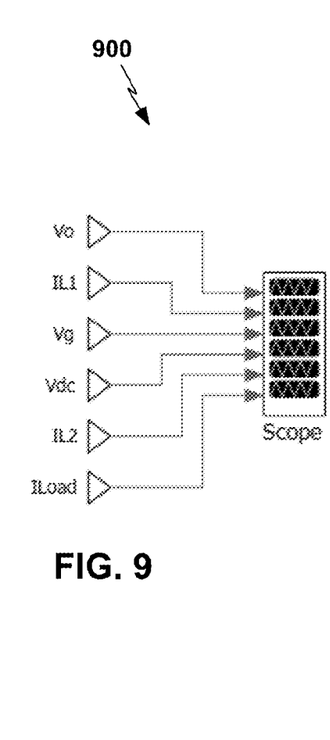
FIG. 9 is a block diagram of an output interface (e.g., an oscilloscope) that depicts indications of various voltage and current values from a converter, in accordance with an example of this disclosure.

FIG. 9 is a block diagram of an output interface 900 (e.g., an oscilloscope) that depicts indications of various voltage and current values from converter 600, in accordance with an example of this disclosure. Output interface 900, in this example, receives indications of an output voltage $V_o$ (e.g., at output capacitor 106 and output node 104), a boost inductor current $I_{L1}$ (e.g., at boost inductor 112 (L1)), a grid input voltage $V_g$ (e.g., at grid voltage input 102), a DC buffer capacitor voltage $V_{dc}$ (e.g., at DC buffer capacitor 152), a boost inductor current $I_{L1}$ (e.g., at boost inductor 112 (L1)), and a load current $I_{load}$ (e.g., at an output node 104), as described above. Output interface 900 may display these values over time as shown in FIGS. 10, 11, and 12, in some examples.

Figure 10:
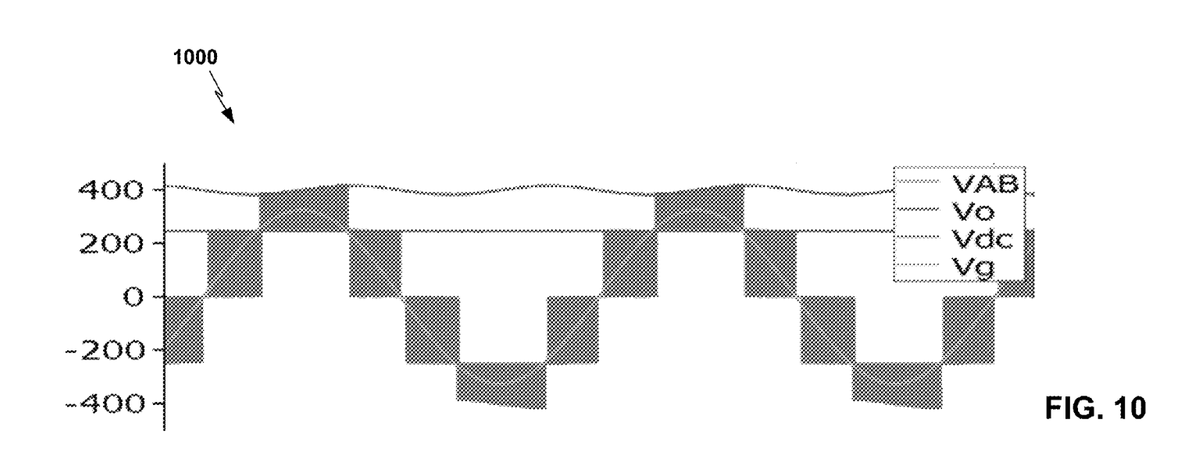
FIG. 10 shows a graph of various voltage values over time from a converter as may be shown in an output interface, in accordance with an example of this disclosure.

FIG. 10 shows a graph 1000 of various voltage values over time from converter 600 as may be shown in an output interface 900, in accordance with an example of this disclosure. Graph 1000 shows input-connected node voltage $V_{AB}$ (e.g., at input-connected nodes 131 and 133 in converters 100, 200, or 600), output voltage $V_o$ (e.g., at output capacitor 106 and output node 104), grid input voltage $V_g$ (e.g., at grid voltage input 102), and DC buffer capacitor voltage $V_{dc}$ (e.g., at DC buffer capacitor 152).

Figure 11:
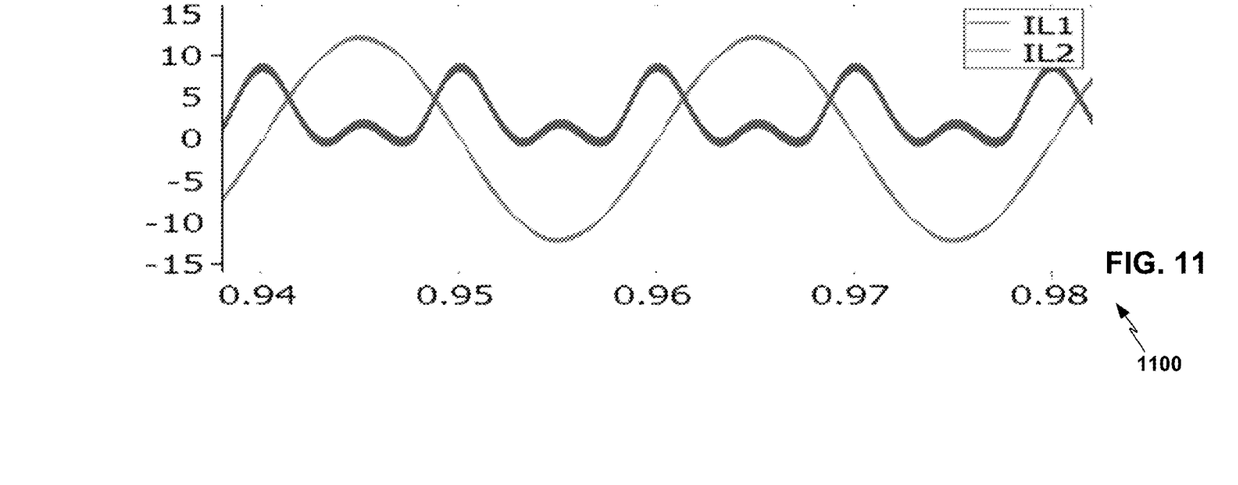
FIG. 11 shows a graph of various current values over time from a converter as may be shown in an output interface, in accordance with an example of this disclosure.

FIG. 11 shows a graph 1100 of various current values over time from converter 600 as may be shown in an output interface 900, in accordance with an example of this disclosure. Graph 1100 shows boost inductor current $I_{L1}$ (e.g., at boost inductor 112 (L1)) and buck inductor current $I_{L2}$ (e.g., at buck inductor 114 (L2)).

Figure 12:
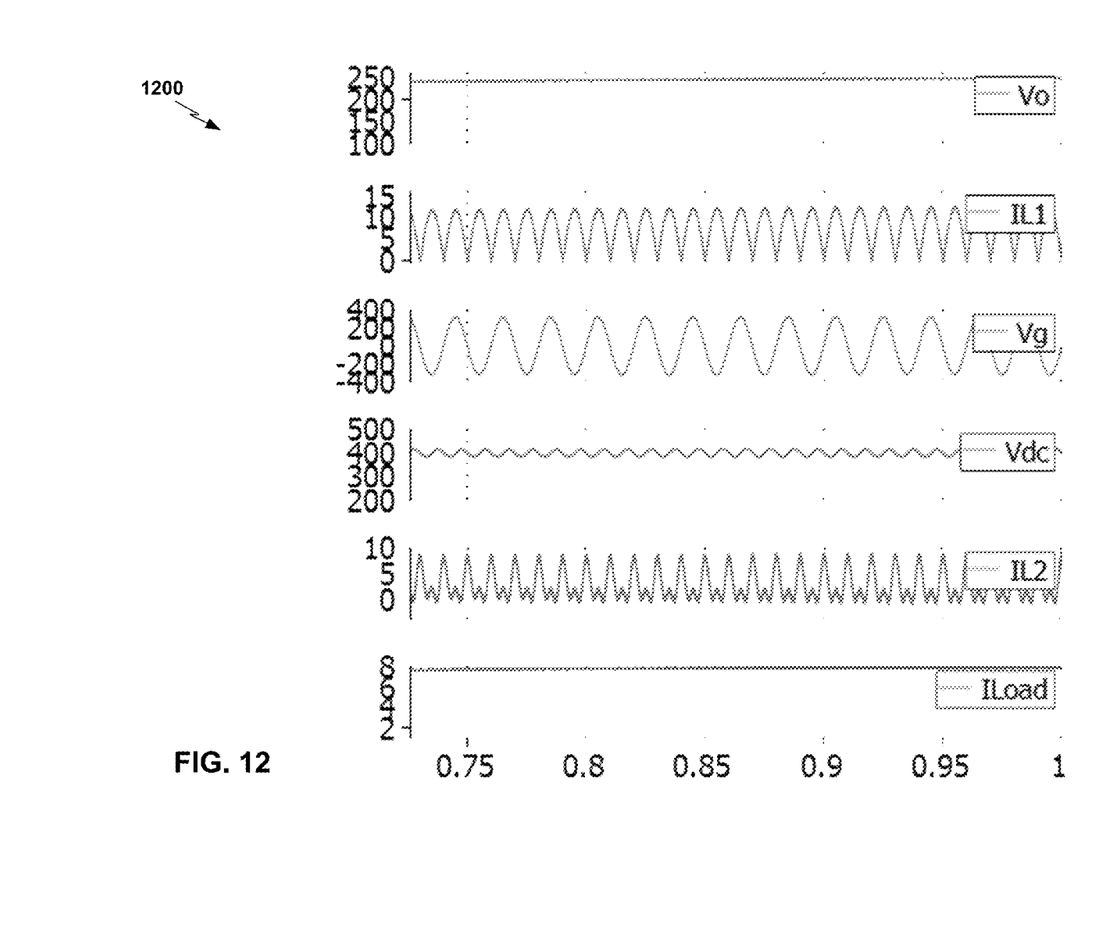
FIG. 12 shows another graph of various voltage and current values over time from a converter as may be shown in an output interface, in accordance with an example of this disclosure.

FIG. 12 shows another graph 1200 of various voltage and current values over time from converter 600 as may be shown in an output interface 900, in accordance with an example of this disclosure. Graph 1200 shows indications of an output voltage $V_o$ (e.g., at output capacitor 106 and output node 104), a boost inductor current $I_{L1}$ (e.g., at boost inductor 112 (L1)), a grid input voltage $V_g$ (e.g., at grid voltage input 102), a DC buffer capacitor voltage $V_{dc}$ (e.g., at DC buffer capacitor 152), a boost inductor current $I_{L1}$ (e.g., at boost inductor 112 (L1)), and a load current $I_{load}$ (e.g., at an output node 104), as described above.

Figure 13:
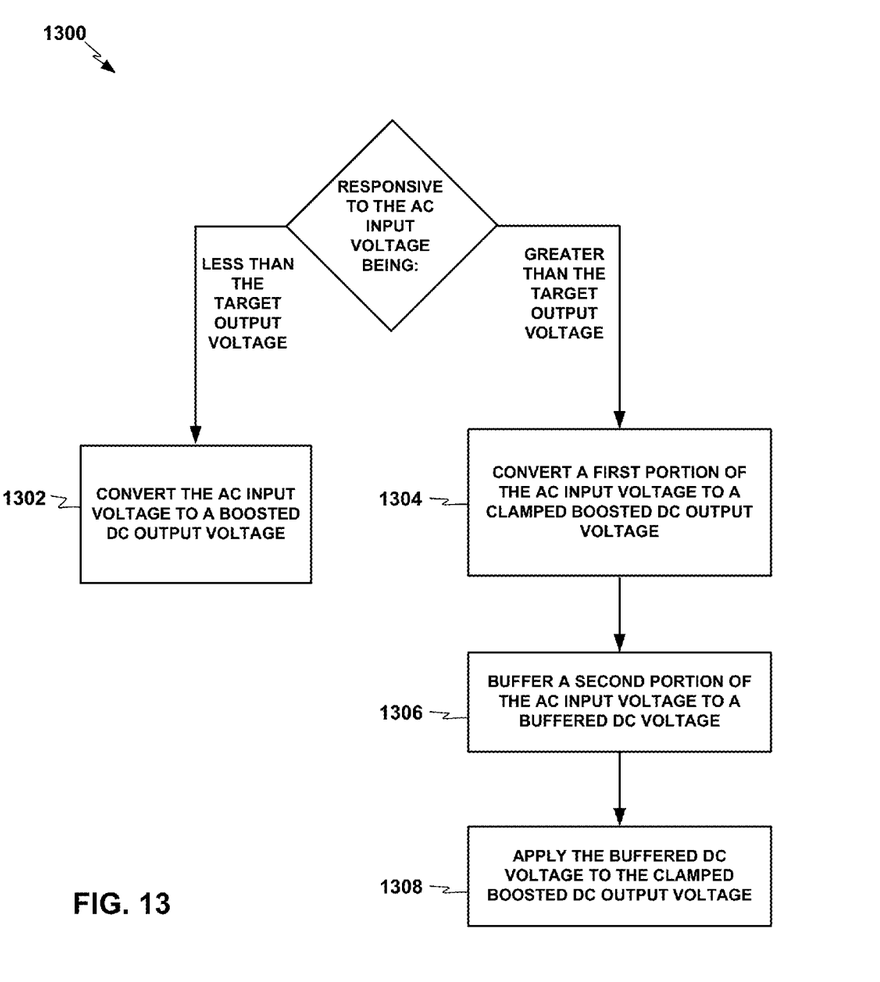
FIG. 13 is a flowchart illustrating a method of operating a buck-type AC/DC converter with DC output harmonic control, among other advantages, in accordance with an example of this disclosure.

FIG. 13 is a flowchart illustrating a method 1300 of operating a buck-type AC/DC converter with DC output harmonic control, among other advantages, in accordance with an example of this disclosure. Method 1300 may be a more generalized form of the operation of various buck-type AC/DC converters, including the examples described above with reference to FIGS. 1-12. In the example of FIG. 13, method 1300 includes, responsive to an AC input voltage (e.g., at grid voltage input 102) being less than the target output voltage, converting the AC input voltage to a boosted DC output voltage (e.g., at output node 104) (1302). Method 1300 further includes, responsive to the AC input voltage being greater than the target output voltage, convert a first portion of the AC input voltage to a clamped boosted DC output voltage (e.g., directed through switch 124 (Q3) to output node 104 (1304). Method 1300 further includes buffering a second portion of the AC input voltage to a buffered DC voltage (e.g., at DC buffer capacitor 152) (1306). Method 1300 further includes applying the buffered DC voltage to the clamped boosted DC output voltage (e.g., at output node 104) (1308).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, an converters 100, 200, or 600 or controller 162 of this disclosure or components thereof may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein.

Various examples of the invention have been described. These and other examples are within the scope of the following claims.

What is claimed is:

1. An AC/DC converter configured to generate a DC output at a target output voltage, the AC/DC converter being configured to:
    responsive to an AC input voltage being less than the target output voltage, convert the AC input voltage to a boosted DC output voltage, wherein converting the AC input voltage to the boosted DC output voltage comprises directing the AC input voltage through a boost inductor to an output node; and
    responsive to the AC input voltage being greater than the target output voltage,
        convert a first portion of the AC input voltage, during a first phase of an AC cycle of the AC input voltage when the AC input voltage is less than a cutoff in an AC phase of the AC input voltage, to a clamped boosted DC output voltage, wherein converting the AC input voltage to the clamped boosted DC output voltage comprises directing the AC input voltage through a clamping diode and the boost inductor to the output node;
        buffer a second portion of the AC input voltage, during a second phase of the AC cycle of the AC input voltage when the AC input voltage is greater than the cutoff in the AC phase of the AC input voltage, to a buffered DC voltage, wherein buffering the second portion of the AC input voltage comprises directing the second portion of the AC input voltage to a DC buffering capacitor; and
        apply the buffered DC voltage to the clamped boosted DC output voltage during the first phase of the AC cycle, wherein applying the buffered DC voltage to the clamped boosted DC output voltage comprises directing the second portion of the AC input voltage from the DC buffering capacitor to the output node.

2. The AC/DC converter of claim 1, further being configured to:
    divide the AC input voltage into the first portion and the second portion as separated by the cutoff in the AC phase of the AC input voltage, wherein the cutoff is set at the target output voltage.

3. The AC/DC converter of claim 1, further being configured to:
    buck the buffered second portion of the AC input voltage, prior to applying the buffered second portion to the clamped boosted DC output voltage,
    wherein bucking the buffered second portion of the AC input voltage comprises directing the buffered second portion of the AC input voltage through a buck inverter.

4. The AC/DC converter of claim 1, wherein converting the first portion of the AC input voltage to the clamped boosted DC output voltage comprises directing the first portion of the AC input voltage through a boost inductor and clamping diodes to an output node.

5. The AC/DC converter of claim 1, wherein the clamped boosted DC output voltage has a ripple phase, and wherein applying the buffered DC voltage to the clamped boosted DC output voltage comprises applying the buffered DC voltage in a ripple canceling phase that opposes the ripple phase of the clamped boosted DC output voltage,
    wherein applying the buffered DC voltage in the ripple canceling phase comprises:
        receiving an indication of the clamped boosted DC output voltage;
        receiving an indication of the buffered DC voltage; and
        determining the ripple canceling phase that opposes the ripple phase of the clamped boosted DC output voltage, based at least in part on the indication of the clamped boosted DC output voltage and the indication of the buffered DC voltage.

6. The AC/DC converter of claim 5, further being configured to:
    direct the indication of the clamped boosted DC output voltage through a high pass filter and a proportional resonant harmonic control configured to control at least a second order harmonic resonance.

7. The AC/DC converter of claim 5, further being configured to:
    direct the buffered second portion of the AC input voltage through a buck inverter,
    wherein applying the buffered DC voltage in the ripple canceling phase further comprises receiving an indication of a buck inductor current of the buck inductor, and
    wherein determining the ripple canceling phase that opposes the ripple phase of the clamped boosted DC output voltage is further based at least in part on the indication of the buck inductor current.

8. The AC/DC converter of claim 1, wherein being configured to apply the buffered DC voltage to the clamped boosted DC output voltage comprises being configured to apply the buffered DC voltage through a buck inductor to the output node only during portions of the AC input cycle when the AC input voltage is above the cutoff.

9. The AC/DC converter of claim 1, wherein the AC/DC converter comprises only two inductors, wherein the two inductors consist of the boost inductor and one buck inductor.

10. The AC/DC converter of claim 9,
    wherein being configured to convert the AC input voltage to the boosted DC output voltage comprises being configured to apply the AC input voltage to the output node through the boost inductor,
    wherein being configured to convert the first portion of the AC input voltage to the clamped boosted DC output voltage, during the first phase of the AC cycle of the AC input voltage when the AC input voltage is less than the cutoff in the AC phase of the AC input voltage, comprises being configured to apply the AC input voltage to the output node through the boost inductor,
    wherein being configured to buffer the second portion of the AC input voltage to the buffered DC voltage, during the second phase of the AC cycle of the AC input voltage when the AC input voltage is greater than the cutoff in the AC phase of the AC input voltage, comprises being configured to apply the AC input voltage to a buffer through the buck inductor, and
    wherein being configured to apply the buffered DC voltage to the clamped boosted DC output voltage comprises being configured, during the first phase of the AC cycle of the AC input voltage when the AC input voltage is less than the cutoff in the AC phase of the AC input voltage, to apply the buffered DC voltage to the output node through the buck inductor.

11. The AC/DC converter of claim 1, wherein being configured to convert the first portion of the AC input voltage to the clamped boosted DC output voltage, during the first phase of the AC cycle of the AC input voltage when the AC input voltage is less than the cutoff in the AC phase of the AC input voltage, comprises being configured to apply energy from the boost inductor to the output node without modulation, and wherein being configured to buffer the second portion of the AC input voltage to the buffered DC voltage, during the second phase of the AC cycle of the AC input voltage when the AC input voltage is greater than the cutoff in the AC phase of the AC input voltage, comprises being configured to modulate the energy from the boost inductor to the output node, and to apply a modulated remainder of the energy from the boost inductor to a buffer.

12. A method of AC/DC conversion to generate a DC output at a target output voltage, the method comprising:

responsive to an AC input voltage being less than the target output voltage, converting the AC input voltage to a boosted DC output voltage, wherein converting the AC input voltage to the boosted DC output voltage comprises directing the AC input voltage through a boost inductor to an output node; and responsive to the AC input voltage being greater than the target output voltage,
converting a first portion of the AC input voltage to a clamped boosted DC output voltage, during a first phase of an AC cycle of the AC input voltage when the AC input voltage is less than a cutoff in an AC phase of the AC input voltage, wherein converting the AC input voltage to the clamped boosted DC output voltage comprises directing the AC input voltage through a clamping diode and the boost inductor to the output node;

buffering a second portion of the AC input voltage to a buffered DC voltage, during a second phase of the AC cycle of the AC input voltage when the AC input voltage is greater than the cutoff in the AC phase of the AC input voltage, wherein buffering the second portion of the AC input voltage comprises directing the second portion of the AC input voltage to a DC buffering capacitor; and applying the buffered DC voltage to the clamped boosted DC output voltage during the first phase of the AC cycle, wherein applying the buffered DC voltage to the clamped boosted DC output voltage comprises directing the second portion of the AC input voltage from the DC buffering capacitor to the output node.

13. The method of claim 12, further comprising:
dividing the AC input voltage into the first portion and the second portion as separated by a cutoff in an AC phase of the AC input voltage, wherein the cutoff is set at the target output voltage.

14. The method of claim 12, further comprising:
bucking the buffered second portion of the AC input voltage, prior to applying the buffered second portion to the clamped boosted DC output voltage, wherein bucking the buffered second portion of the AC input voltage comprises directing the buffered second portion of the AC input voltage through a buck inverter.

15. The method of claim 12, wherein the clamped boosted DC output voltage has a ripple phase, and wherein applying the buffered DC voltage to the clamped boosted DC output voltage comprises applying the buffered DC voltage in a ripple canceling phase that opposes the ripple phase of the clamped boosted DC output voltage, wherein applying the buffered DC voltage in the ripple canceling phase comprises:
receiving an indication of the clamped boosted DC output voltage;
receiving an indication of the buffered DC voltage; and
determining the ripple canceling phase that opposes the ripple phase of the clamped boosted DC output voltage, based at least in part on the indication of the clamped boosted DC output voltage and the indication of the buffered DC voltage.

16. The method of claim 15, further comprising:
directing the indication of the clamped boosted DC output voltage through a high pass filter and a proportional resonant harmonic control configured to control at least a second order harmonic resonance.

17. The method of claim 15, further comprising:
directing the buffered second portion of the AC input voltage through a buck inverter,
wherein applying the buffered DC voltage in the ripple canceling phase further comprises receiving an indication of a buck inductor current of the buck inductor, and
wherein determining the ripple canceling phase that opposes the ripple phase of the clamped boosted DC output voltage is further based at least in part on the indication of the buck inductor current.

18. A device for receiving an AC input voltage and generating a DC output at a target output voltage, the device comprising:

a controller configured to determine whether the AC input voltage is less than the target output voltage;
responsive to the AC input voltage being less than the target output voltage, means for converting the AC input voltage to a boosted DC output voltage; and
responsive to the AC input voltage being greater than the target output voltage, means for converting a first portion of the AC input voltage to a clamped boosted DC output voltage, during a first phase of an AC cycle of the AC input voltage when the AC input voltage is less than a cutoff in an AC phase of the AC input voltage;
means for buffering a second portion of the AC input voltage to a buffered DC voltage, during a second phase of the AC cycle of the AC input voltage when the AC input voltage is greater than the cutoff in the AC phase of the AC input voltage; and
means for applying the buffered DC voltage to the clamped boosted DC output voltage during the first phase of the AC cycle.

* * * * *